Jan. 3, 1967  W. G. STOPPE  3,295,799
FUEL TANK
Filed Sept. 7, 1965  2 Sheets-Sheet 1
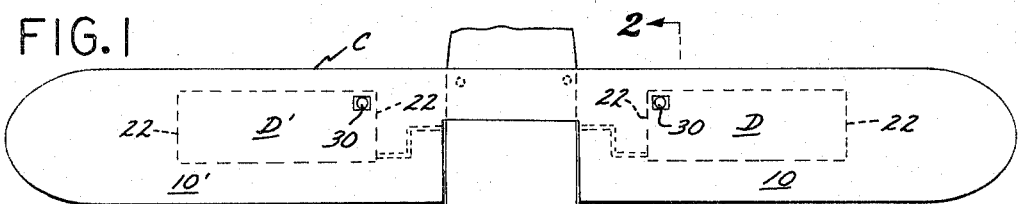
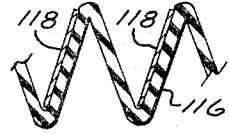  
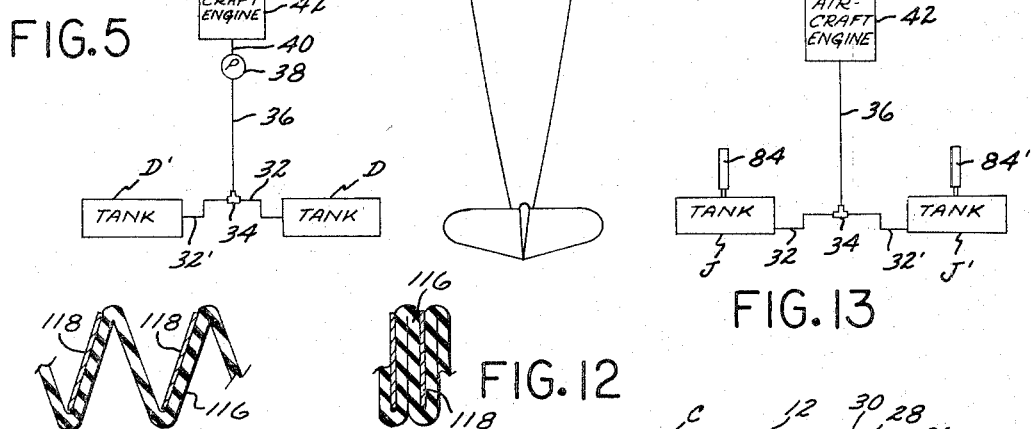
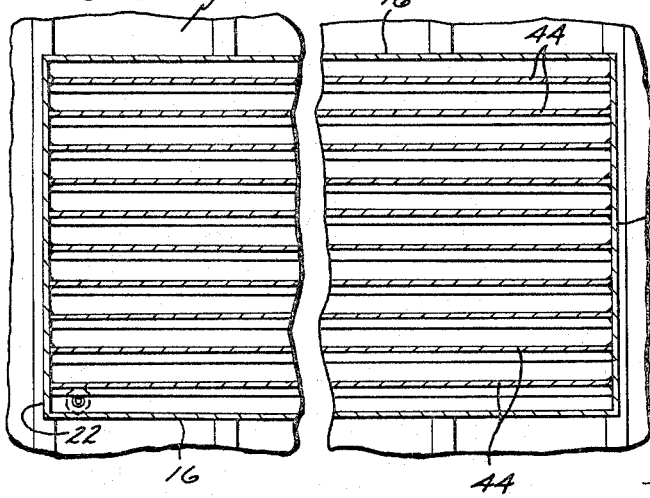 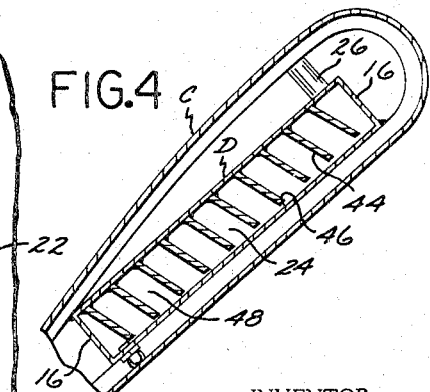
INVENTOR.
WILLY G. STOPPE
BY
William C. Babcock
ATTORNEY Jan. 3, 1967  W. G. STOPPE  3,295,799
FUEL TANK
Filed Sept. 7, 1965  2 Sheets-Sheet 2
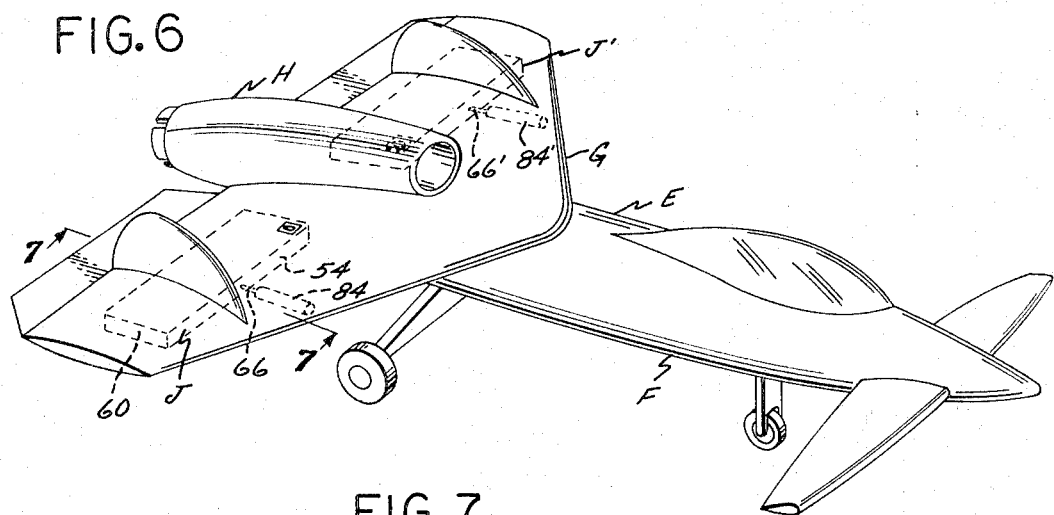
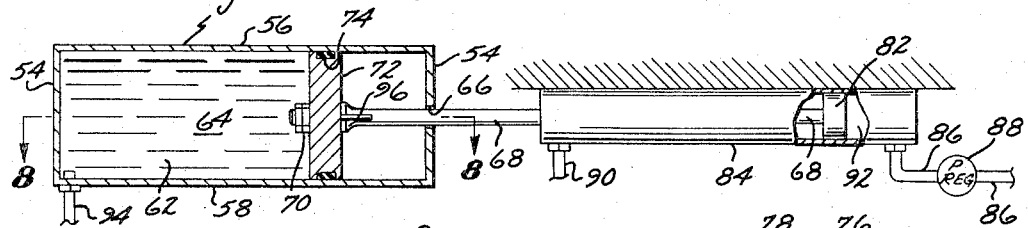
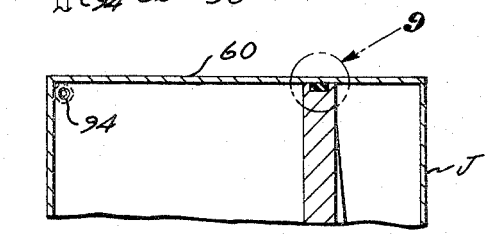
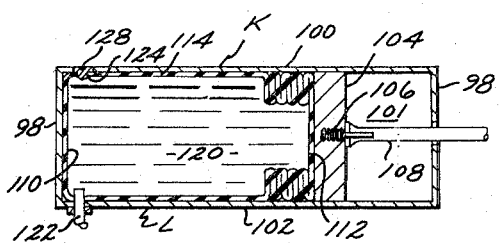
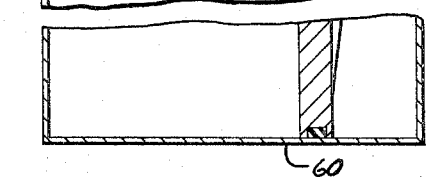
INVENTOR.
WILLY G. STOPPE
BY
William C. Babcock
ATTORNEY United States Patent Office 3,295,799
Patented Jan. 3, 1967

3,295,799
FUEL TANK
Willy G. Stoppe, 936 Cedar Ave., Apt. 5,
Long Beach, Calif. 90813
Filed Sept. 7, 1965, Ser. No. 485,398
1 Claim. (Cl. 244—135)

The present invention is a continuation-in-part of my application entitled Variable Lift Wing, filed in the United States Patent Office December 11, 1964, under Serial No. 417,553, which in turn is a division of my Patent No. 3,190,583, entitled Variable Lift Wing, that issued June 22, 1965.

The present application relates generally to the field of aircraft, and more particularly to a fuel tank for use in an aircraft having one or more tiltable air foil surfaces to selectively vary the lift, glide, and landing characteristics of the plane.

A major object of the present invention is to provide one or more fuel tanks for an aircraft having one or more tiltable air foil surfaces to prevent sudden movement of the liquid fuel in the tank as the air foil surfaces are tiltably adjusted in the take-off and landing of the plane, as well as when the plane is in flight.

Another object of the invention is to provide means for minimizing movement of liquid fuel in a tank when the position of the tank is varied, and these means having the advantages of a simple mechanical structure, capable of being fabricated from standard commercially available materials, requiring a minimum of maintenance attention, and being simple and easy to use.

Yet another object of the invention is to provide a fuel tank of such structure that the movement of fuel therein is controlled, and sloshing of the liquid in the tank minimized to stabilize the operation of the aircraft.

These and other objects and advantages of the invention will become apparent from the following description of several forms thereof and from the accompanying drawings illustrating the same, in which:

FIGURE 1 is a partial top plan view of an aircraft having a fuselage, a transverse wing that is tiltable relative thereto, and first forms of fuel tanks embodying the present invention disposed within the confines of the wings;

FIGURE 2 is a transverse cross-sectional view of one of the wings and first form of fuel tank taken on the line 2—2 of FIGURE 1;

FIGURE 3 is a horizontal cross-sectional view of the first form of the fuel tank, taken on the line 3—3 of FIGURE 2;

FIGURE 4 is the same view as shown in FIGURE 2, but with the wing and tank tilted at a substantial angle relative to the horizontal;

FIGURE 5 is a diagrammatic view of the manner in which the first forms of fuel tanks are connected to the engine used in powering the aircraft shown in FIGURE 1;

FIGURE 6 is a perspective view of a second form of aircraft including a transverse tiltable wing provided with a second form of fuel tank disposed within the confines thereof;

FIGURE 7 is a transverse cross-sectional view of the wing shown in FIGURE 6, taken on the line 7—7 thereof;

FIGURE 8 is a horizontal cross-sectional view of the second form of tank shown in FIGURES 6 and 7, taken on the line 8—8 of FIGURE 7;

FIGURE 9 is an enlarged fragmentary cross-sectional view of a portion of the second form of tank shown in FIGURES 6, 7 and 8, illustrating the detailed structure of that portion of the tank within the circle defined by phantom line in FIGURE 8;

FIGURE 10 is a transverse cross-sectional view of a third form of fuel tank that can be disposed in the same position within a wing as that of the tank shown in FIGURE 6;

FIGURE 11 is an enlarged vertical cross-sectional view of a sealing portion of the third form of fuel tank shown in FIGURE 10;

FIGURE 12 is the same view shown in FIGURE 11, but showing the sealing portion disposed in a second position; and FIGURE 13 is a diagrammatic view of the manner in which the second forms of fuel tanks are connected to the engine used in powering the aircraft shown in FIGURE 6.

With continuing reference to the drawings for the general arrangement of the invention, the first form A of the aircraft is shown in FIGURE 1. The aircraft A includes an elongate fuselage B having a transverse tiltable wing C mounted thereon, with sections 10 and 10' of the wing being located on each side of the fuselage.

The first form A of the aircraft is illustrated in detail in FIGURES 6–8 inclusive of my Patent No. 3,190,583.

The wing C, as may be seen in FIGURE 2, is hollow and is defined by a rigid outer skin 12, and a number of longitudinally spaced, transversely extending ribs 14 are located on the interior surface of the skin. Wing C can be of a configuration to define any desired air foil surface. Two elongate liquid fuel tanks D and D' of a first form are located within the confines of sections 10 and 10', as shown in FIGURE 1. Inasmuch as these tanks D and D' are structurally the same, only tank D will be described in detail herein.

The first form of tank D is preferably rectangular and comprised of two laterally spaced parallel side walls 16, that are connected to a top wall 18 and bottom wall 20. Walls 16, 18 and 20 are connected to two end walls 22 which provide a confined space 24 in which liquid fuel (not shown) is contained.

A liquid fuel inlet tube 26 extends downwardly through an opening in skin 12 and is in communication with the confined space 24. The inlet tube 26 is normally closed by a threaded plug 30 or other conventional closure means. The rear portion of space 24 is in communication with a fuel discharge line 32, as shown in FIGURES 2 and 5, that extends to a T 34. A conduit 36 extends from T 34 to a fuel pump 38, which is in turn connected by a conduit 40 to a suitable aircraft engine 42 to fuel the same. The tank D' is connected by a conduit 32' to the T 34'.

The first form of tank D is provided with a number of spaced parallel baffles 44 projecting downwardly into the confined space 24 from the interior surface of the top wall 18, and these baffles terminate a short distance above the upper surface of the bottom wall 20 to define passages 46 through which the liquid fuel can flow to the fuel discharge line 32. The baffles 44, together with tank D, cooperatively define a number of compartments 48, each of which is capable of holding a portion of the fuel disposed within the tank. The baffles 44 may be secured to the interior surface of the top wall 18 by welding beads 50, or other conventional fastening means.

The passages 46 are relatively small, and when the wing C is abruptly tilted, an appreciable length of time is required for fluid to flow rearwardly through the passages to be subsequently discharged from the line 32. Abrupt movement of wing C in a clockwise direction from the position shown in FIGURE 4 to that shown in FIGURE 2 results in a very gradual change of the position of the liquid fuel within space 24, due to the length of time required for the liquid to flow through passages 46. Also, the compartments 48 prevent sloshing of the liquid fuel in tank D when the plane on which the tank is carried is accelerated or decelerated.

The tank D (FIGURE 2) is preferably secured in a rigid position within the confines of wing C by welding beads 52 to the inner edges of the ribs 14. The use and operation of the first form of the invention are relatively simple, as previously described in detail, and need not be repeated.

The pump 38 draws fuel concurrently from both tanks D and D', and in so doing, the liquid fuel level in these tanks tends to remain at substantially identical heights whereby no weight imbalance occurs between the tanks to disturb the stability of the aircraft A during flight.

An aircraft E is shown in FIGURE 6 that includes an elongate fuselage F, from the rear portion of which a transverse wing G is tiltably supported, which wing supports a jet engine H. The form of aircraft shown in FIGURE 6 was described and claimed in my copending application Serial No. 417,553, and illustrated in FIGURES 9–12 inclusive and FIGURE 14 thereof. Two laterally spaced fuel tanks J and J' of a second form are situated within the confines of aircraft E. Tanks J and J' are of identical structure and accordingly only tank J will be described in detail.

The tank J is comprised of two laterally spaced side walls 54 that are connected by an upper wall 56 and bottom wall 58, as well as two parallel end walls 60, which with the side walls 54, top wall 56 and bottom wall 58, cooperatively define a confined space 62 in which liquid fuel 64 is stored.

An opening 66 is formed in the forwardly disposed side wall 54 (FIGURES 6 and 7) in which a piston rod 68 is slidably mounted. The left-hand end of piston rod 68, as shown in FIGURE 7, is secured by conventional means 70 to a movable partition 72 which is slidably mounted within the confines of tank J. The partition 72 is of substantial thickness, and a recess 74 extends continuously around the outer portion thereof. Recess 74 supports a resilient sealing member 76, as best shown in FIGURE 9, and a number of teeth 78 are defined on the outer portion of this sealing member which slidably and sealingly engage the interior surface 80 of the upper wall 56, bottom wall 58 and end wall 60. The teeth 78 are preferably elongate, and of such configuration that the portions contacting the surface 80 tend to be forced into pressure contact therewith when the partition 72 is moved to the left, as viewed in FIGURE 7.

When the wing G is adjustably tilted, the trail-edge thereof always extends downwardly. During such tilting of wing G, due to the force of gravity the fuel 64 tends to flow to the left (FIGURE 7). The piston rod 68 is secured to a piston 82 that is slidably mounted in the interior of a hydraulic cylinder 84, as also shown in FIGURE 7. Fluid under pressure can be discharged into the right-hand interior end of cylinder 84 through a conduit 86.

The pressure exerted on the fuel 64 in tank J is controlled by a pressure regulating valve 88 connected to the conduit 86, which valve regulates the pressure at which fluid is discharged into cylinder 84 on the right-hand side of piston 82. A conduit 90 is connected to the left-hand interior end of the hydraulic cylinder 84 (FIGURE 7) and permits discharge of fluid into the cylinder on the left-hand side of the piston 82 to return this piston and partition 72 to positions where the partition is disposed adjacent to the side wall 54 on the right-hand end of tank J. It will be obvious that when such movement to the right of partition 72 occurs, the valve 88 must be placed in a condition to permit flow of actuating fluid from the right-hand interior portion 92 of cylinder 84 through conduit 86 for return to a reservoir (not shown) or other suitable storage therefor. When the interior portion 92 of cylinder 84 is filled with hydraulic fluid under pressure, the partition 72 is moved to the left (FIGURE 7), and at all times causes the fuel 64 on the left-hand side of the partition to completely fill that portion of space 62.

A fuel discharge outlet 94 is connected to the lower left-hand interior of tank J through which the pressurized fuel 64 in the tank is discharged to the engine H. To prevent binding of the partition 72 during tilting as it is moved in tank J, a transverse rib or beam 96 is affixed to the forward face thereof, as shown in FIGURE 8, and secured to the piston rod 68 (FIGURE 8).

A third form of fuel tank K that may be used in the same manner as tank J is shown in FIGURES 10, 11 and 12. Tank K is preferably rectangular and comprised of two laterally spaced parallel side walls 98, a top wall 100, bottom wall 102, and end walls 101. A movable partition 104 is slidably movable within the confines of tank K and secured by conventional means 106 to the rear end of a piston rod 108. Piston rod 108 can be moved by the same hydraulic cylinder structure used in moving the piston rod 68 illustrated in FIGURE 7.

A resilient bag L formed from neoprene or other resilient material not susceptible to damage by liquid fuel is disposed within the confines of tank K. A first side wall 110 of bag L is bonded by conventional means to the interior surface of the left-hand side wall 98 of tank K. The second side wall 112 of bag L is bonded to the rear face of partition 104, as shown in FIGURE 10. Between side walls 110 and 112 the bag L is defined by a continuous rectangular band 114 in which accordion type pleats 116 are formed extends circumferentially therearound, as may be seen in FIGURE 1.

Four rigid members 118 are secured to each of the pleats 116 when the bag L is stretched out (FIGURE 10), and these pleats are in abutting contact with the interior surface of the upper wall 100, lower wall 102, and end walls 101 of tank K. When bag L is partially collapsed the members 118 occupy the relative positions shown in FIGURE 11. However, when the bag L is compressed to exert pressure on the liquid fuel 120 therein, the members 118 are forced into abutting contact with parts of the pleats 116 most adjacent thereto (FIGURE 12).

Liquid fuel 120 in the third form of tank K discharges through a conduit 122 located in the rear portion of the tank and extends upwardly through the resilient bag L and bottom wall 102. Conduit 122 also extends to the jet engine H, or other source of power for the aircraft E. An opening 124 is provided in the rear portion of wall 100 and band 124, in which a plug 126 is removably mounted to permit discharge of fuel into tank K when the plug 128 is removed therefrom. Because bag L hermetically contains the fuel 120 within the confines thereof any leakage of fuel therefrom is prevented, and the partition 104 accordingly need not sealingly engage the interior surfaces of walls 100, 102 and 101 as required when piston 82 is used in the manner shown in FIGURE 9. The second form J of the tank and third form thereof are used in the same manner end accordingly a detailed description of the use of the third form K of the tank need not be described.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claim.

I claim:

The combination with an engine-powered aircraft, provided with an elongate fuselage which supports a transverse wing that can be tilted to a desired degree to control the flight characteristics of said aircraft, of, (a) at least one elongate, longitudinally extending tank located within said wing;

(b) a resilient bag situated within said wing in which said fuel is contained, with said bag having a plurality of pleats formed therein that are parallel to the longitudinal axis thereof;

(c) first means for introducing liquid fuel into said bag;

(d) second means for discharging said liquid fuel from said bag to said engine;

(e) a piston slidably mounted in said tank for exerting a force on said bag in a direction wherein said pleats tend to move into abutting contact with one another, with said liquid fuel in said bag being maintained under pressure to prevent movement of said liquid relative to said wing as said wing is tilted; and (f) a plurality of rigid elongate members affixed to said pleats to maintain the shape thereof, which members are in abutting contact with the interior surface of said tank when said bag is fully expanded.

References Cited by the Examiner

UNITED STATES PATENTS

| | | | |
|---|---|---|---|
| 1,003,796 | 9/1911 | Ragot | 244—135 |
| 1,969,200 | 8/1934 | Bellanca | 244—135 |
| 2,806,665 | 9/1957 | Gibson | 244—135 |
| 3,066,890 | 12/1962 | Price | 244—135 X |
| 3,208,696 | 9/1965 | Kastan | 244—135 |

FOREIGN PATENTS 1,095,131  12/1960  Germany.

FERGUS S. MIDDLETON, *Primary Examiner.*

MILTON BUCHLER, *Examiner.*

B. BELKIN, *Assistant Examiner.*